United States Patent
Milojicic et al.

(10) Patent No.: US 12,236,240 B2
(45) Date of Patent: Feb. 25, 2025

(54) FRESHNESS AND GRAVITY OF DATA OPERATORS EXECUTING IN NEAR MEMORY COMPUTE IN SCALABLE DISAGGREGATED MEMORY ARCHITECTURES

(71) Applicant: HEWLETT PACKARD ENTERPRISE DEVELOPMENT LP, Spring, TX (US)

(72) Inventors: Dejan S. Milojicic, Milpitas, CA (US); Kirk M. Bresniker, Milpitas, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 70 days.

(21) Appl. No.: 18/181,307

(22) Filed: Mar. 9, 2023

(65) Prior Publication Data
US 2024/0303078 A1 Sep. 12, 2024

(51) Int. Cl.
G06F 9/30 (2018.01)
G06F 9/50 (2006.01)

(52) U.S. Cl.
CPC .......... *G06F 9/3004* (2013.01); *G06F 9/5016* (2013.01)

(58) Field of Classification Search
CPC ............................ G06F 9/3004; G06F 9/5016
See application file for complete search history.

(56) References Cited

U.S. PATENT DOCUMENTS

2021/0271680 A1  9/2021 Lee et al.

OTHER PUBLICATIONS

Keeton, K. et al., "MODC: Resilience for Disaggregated Memory Architectures Using Task-based Programming," Sep. 11, 2021, 9 pages.
Lee, S-S et al., "MIND: In-Network Memory Management for Disaggregated Data Centers," Oct. 26-299, 2021, pp. 488-504.
Lim, K. et al., "System-level Implications of Disaggregated Memory," Jan. 13, 2012, 18th Int'l Symposium on High Performance Computer Architecture, 12 pages.

*Primary Examiner* — Corey S Faherty
(74) *Attorney, Agent, or Firm* — Slater Matsil, LLP

(57) ABSTRACT

The disclosure provides for systems and methods for improving bandwidth and latency associated with executing data requests in disaggregated memory by leveraging usage indicators (also referred to as usage value), such as "freshness" of data operators and processing "gravity" of near memory compute functions. Examples of the systems and methods disclosed herein generate data operators comprising near memory compute functions offloaded proximate to disaggregated memory nodes, assign a usage value to each data operator based on at least one of: (i) a freshness indicator for each data operators, and (ii) a gravity indicator for each near memory compute function; and allocate data operations to the data operators based on the usage value.

20 Claims, 7 Drawing Sheets

FRESHNESS AND GRAVITY OF DATA OPERATORS EXECUTING IN NEAR MEMORY COMPUTE IN SCALABLE DISAGGREGATED MEMORY ARCHITECTURES

BACKGROUND

The conventional approach of moving data to a CPU for computation has become a significant performance bottleneck for emerging scale-out data intensive applications due to their limited data reuse and relatively slow interconnect performance compared to local cache access. At the same time, the advancement in 3D integration technologies has made the decade-old concept of coupling compute units close to the memory commonly called near memory computing (NMC) more viable. Processing right at the memory can significantly diminish the data movement problem of data-intensive applications.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
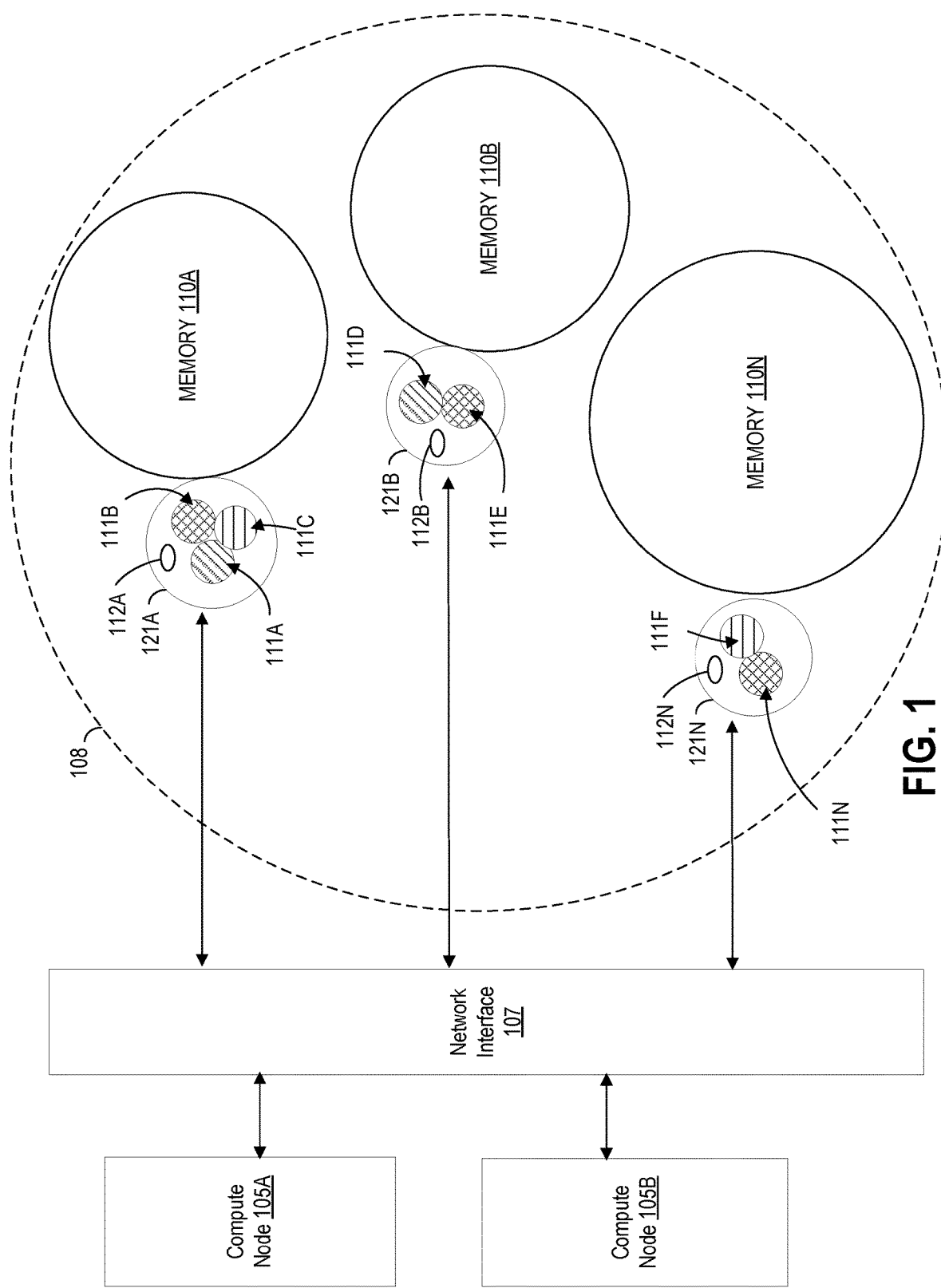
FIG. 1 illustrates an example architecture in which data query operations to disaggregated memory can be offloaded to near memory computes.

The figures are not exhaustive and do not limit the present disclosure to the precise form disclosed.

DETAILED DESCRIPTION

Over the years, memory technology has not been able to keep up with advancements in processor technology in terms of latency and energy consumption. The demise of Dennard scaling, slowing of Moore's law, and dark silicon computer performance has reached a plateau. At the same, an enormous amount of data is being generated across multiple disciplines (e.g., material science, chemistry, health sciences etc.). On traditional systems, these applications cause frequent data movement between a memory subsystem and a processor of a server. Frequent data movement within a sever impacts performance and energy efficiency. System architects have tried to bridge this gap by introducing memory hierarchies that mitigate some of the disadvantages of off-chip DRAMs. However, the limited number of pins on the memory package are not able to meet today's bandwidth demands of multicore processors.

Conventional memory hierarchy usually consists of multiple levels of cache, a main memory, and storage. For example, one conventional approach is to process data after moving data up to caches from the storage. In contrast, near-memory computing (NMC) aims at processing data close to where the data resides. This data centric approach moves compute units as close as logically and/or physically possible to the storage on which data resides and seeks to minimize the expensive data movements. For example, three-dimensional stacking enables processing close to the memory. By stacking the logic and memory together using through-silicon via's (TSVs), NMC can help in reducing memory access latency, power consumption and provides much higher bandwidth.

Moving the computation closer to memory allows for sidestepping performance and energy bottlenecks in data movement by circumventing memory-package pin-count limitations. NMCs accelerate access to memory by means of data operators that perform data operations close to memory and thereby eliminate overhead of multiple interconnect traversals to and from memory. NMCs connect to memory through a memory interface rather than an interconnect interface. The memory interface can provide latency at tens of nanoseconds, opposed hundreds of nanoseconds latency (e.g., 300 ns) on an interconnect interface. Through the use of data operators, NMCs can effectively increase bandwidth and decrease latency between memory and compute nodes. By performing operations close to the memory, the amount of data for performing a data request that needs to be transmitted between compute node and the memory can be reduced, which effectively increases the bandwidth of the interconnect and reduces latency as compared to requesting all data from the memory and performing operations at the compute node. Data operators can be in the form of addressing (e.g., pointer chasing), filtering (e.g., data reduction) or more complex computation (e.g., initialization, encryption, compression, projections, etc.). For NMCs where the operators are not fixed functions, the numbers of operators are usually limited, and they need to be shared and could potentially be replaced with more frequently used operators.

A data operator can be disposed between the memory and network layers and can control how data moves from the memory to the network, thus controlling how the data is retrieved from a memory stack. The memory stack can include disaggregated memory, which is a form of scale-out storage, built with some number of storage devices that function as a logical pool of storage that can be allocated to any server on the network over a network fabric. Client devices can access the disaggregated memory by establishing a connection with one or more data operators. Whenever a client makes a request, a network stack routes the request to a data operator assigned to the client device that initiated the data request.

Databases are uniquely positioned to exploit disaggregated memory to address both the issues of inefficient data movement and DRAM capacity. Implementations of NMC disclosed herein can include physically detaching query processing from memory buffer management. Traditionally, query processing threads access database tables by reading them from a buffer pool and copying the data to their private working space. According to implementations disclosed herein, the buffer pool can be placed on the network attached disaggregated memory, with query processing nodes provisioned on demand to run a query by reading the data from the network attached buffer pool. The implementations disclosed herein provide multiple advantages, such as but not limited to: (1) reducing data movement by pushing down operators to the disaggregated memory, so that the processing nodes receive only the relevant data; and (2) reducing memory requirements for computing nodes by centralizing the buffer cache in disaggregated memory and removing unnecessary copying of the data to the compute nodes.

In contrast to remote memory, disaggregated memory systems use network attached memory that is distinct from the memory in compute nodes, such as, but not limited to, client devices. Compute nodes in various implementations can be devices that provide ephemeral storage, networking, memory, and processing resources that can consume disaggregated memory instances. This approach allows the disaggregated memory to scale independently of the system's computing or storage capacity, and removes the need to over-provision one resource to scale another. In disaggregated memory systems network overhead is a bottleneck constraining performance.

The implementations disclosed herein provide systems and methods that can improve bandwidth and latency associated with accessing data via interconnect fabrics on a network attached to disaggregated memory while also reducing energy associated with accessing the data via interconnect fabrics by leveraging usage indicators, such as a "freshness" indicator for each data operator and a "gravity" indicator of an NMC toward a compute node. The usage indicators can each represent a unit of measurement of appropriateness of an NMC for a given data request, allowing a system hosting the disaggregated memory to optimize overall performance of the system by managing each NMC and data operator within the system. For example, data operators and/or NMCs can be assigned to data requests based on one or more of the usage indicators, which can provide for optimal performance.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example architecture in which data query operations to a memory can be offloaded to NMCs. FIG. 1 includes a plurality of compute nodes 105 (e.g., a first compute node 105A and a second compute node 105B) connected to a disaggregated memory 108 via a network interface 107. Compute nodes 105 may issue data queries requesting data from disaggregated memory 108 as part of data operations. Compute nodes 105 may be implemented as any computation device connected to the disaggregate memory 108 via network interface 107. For example, a compute node 105 may be a client device. As another example, compute node 105 could be a server with CPU, memory, network interfaces. In an example implementation, computer node 105 may be implemented as a computer system 700 of FIG. 7. In another example, a number of compute nodes can be organized in clusters, where each cluster represents a compute node 105.

The disaggregated memory 108 comprises a logical pool of memories 110 (e.g., memory 110A, memory 110B, memory 110N, etc.). Each memory 110 of FIG. 1 may be an example disaggregate memory node on an interconnect fabric. For example, a plurality of disaggregated memory nodes 110 may connected via a plurality of interconnected fabrics. Accordingly, disaggregated memory 108, in some examples, may serve the purpose of memory that was disaggregated from compute nodes 105 and can be shared across a plurality of computer nodes 105. In some cases, the disaggregated memory may be shared by all nodes. Network interface 107 may be an example of a fabric interface.

The disaggregate memory 108 also comprises a plurality of dynamic regions 121 (e.g., a first dynamic region 121A, a second dynamic region 121B and a third dynamic region 121N). Each dynamic region 121 (also referred to herein as an NMC) comprises one or more data operators 111 (e.g., a first data operator 111A, a second data operator 111B, a third data operator 111C, a fourth data operator 111E, a fifth data operator 111F, and a sixth data operator 111N). In one example, the plurality of data operators 111 include query operators comprising: (i) selection operators configured to filter data according to a collection of predicates, (ii) projection operators configured to reduce the columns returned and reduce memory accesses, (iii) aggregation operators, (iv) distinct operators, (v) group-by operators configured to combine tuples (e.g., distinct, group by aggregation), (vi) regular expression matching operators, (vii) encryption operators and (viii) system support operators configured to process data in-situ before sending data (e.g., encryption/decryption) and perform system optimization tasks like packing data to reduce the overall network usage. Data operators 111 may be implemented using ASICs, using FPGAs, SmartNICs, ARM, other processors, etc. In an example implementation, a data operator 111 may be implemented as an instance of computer system 700 of FIG. 7.

In some implementations, each dynamic region 121 comprises one or more data stores 112 (e.g., data stores 112A, data stores 112B, . . . , data stores 112N). Data stores 112 may store indicators and policies for assigning, loading, and managing data operators 111 loaded into corresponding dynamic region 121. For example, data stores 112 may store first usage indicators of each data operator 111, which may be leverages by the NMC to manage data operators for executing a data request according to policies. As another example, data stores 112 may store second usage indicators of a corresponding dynamic region 121, which may be leverages by the NMC to manage data operators for executing a data request according to policies.

The disaggregated memory 108 can be accessed by one or more of the plurality of compute nodes 105. For example, first compute node 105A and second compute node 105B can both access the disaggregated memory 108 and/or one of the first computer node 105A and the second computer node 105B can access the disaggregated memory 108. In one example, compute node 105A and computer node 105B may each invoke a data request in the form of a projection and selection of two data queries, which are offloaded to the disaggregated memory 108 as data operators 111 of a corresponding dynamic region 121, while a joint and final projection is executed at the compute nodes 105A and 105B. In one example, the disaggregated memory 108 includes a programming interface comprising a data API for path operations and connection management operations. By connecting the data API to memories 110, data operators 111 can be offloaded to the disaggregated memory 108 effectively functioning as a bump-in-the wire stream processor.

Data operator pipelines can be constructed from individual blocks that implement a given data operator and provide standard interfaces to combine the data operators into pipelines. The modular nature of the pipelines allows the operators to be easily swapped and extended (e.g., join operators). An example data operator pipeline is provided below in connection with FIG. 3.

Figure 2:
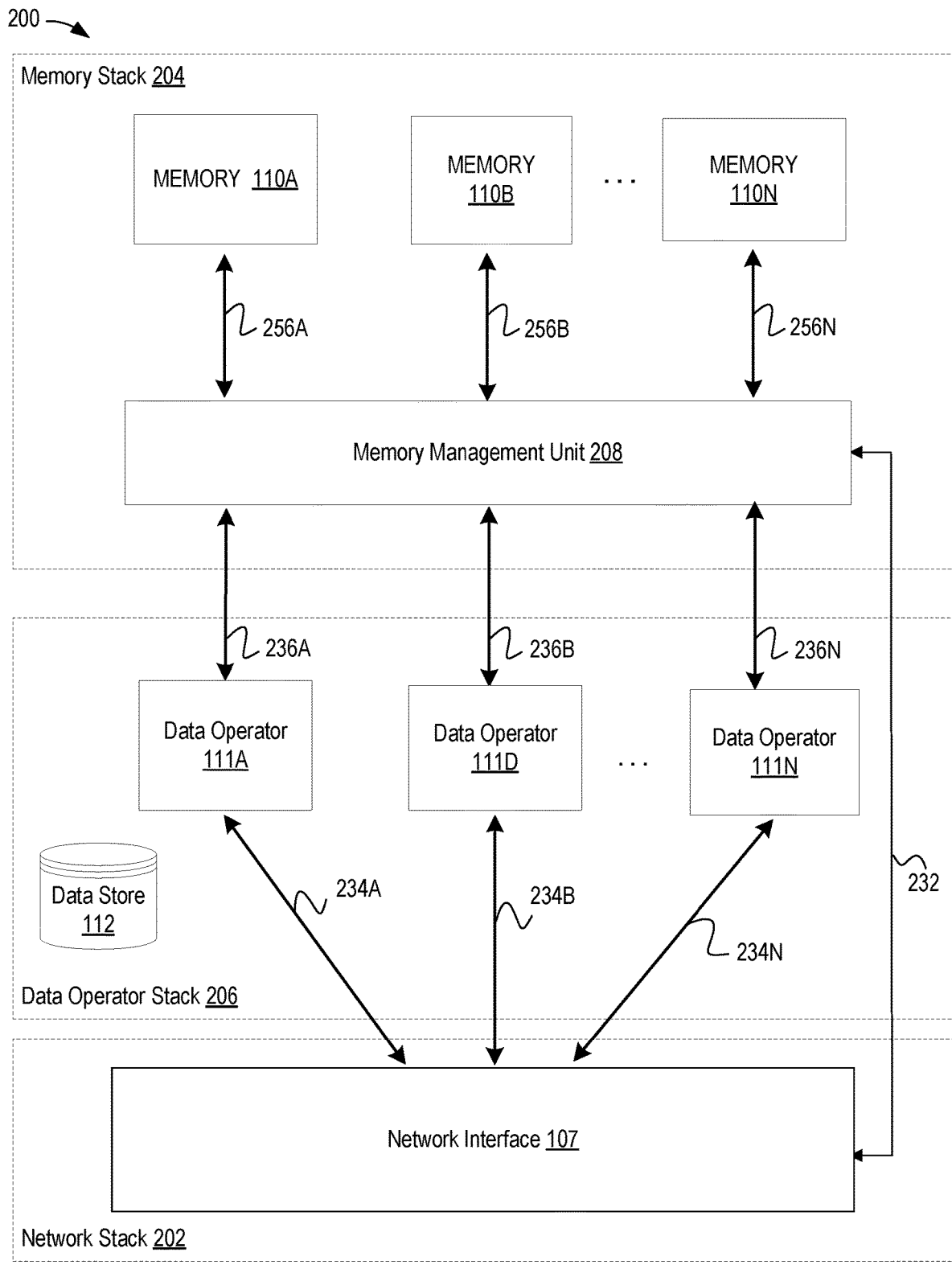
FIG. 2 illustrates another example architecture in which the systems and methods described herein may be implemented.

FIG. 2 illustrates another example architecture 200 in which the systems and methods described herein may be implemented. The example architecture 200 includes a memory stack 204, a data operator stack 206, and a network stack 202. Data is transmitted from one or more compute nodes (e.g., compute node 105A, compute node 105B of FIG. 1) to and from the memory stack 204 via the network stack 202 and the data operator stack 206. The memory stack 204 includes disaggregated memory (e.g., disaggregated memory 108 of FIG. 1) comprising a pool of memory (e.g., memory 110A, memory 110B, . . . memory 110N of FIG. 1) connected to a memory management unit 208 via a plurality of channels (e.g., channel 256A, channel 256B . . . channel 256N). The data operator stack 206 includes a plurality of data operators 111 (e.g., data operator 111A, data operator 111B, . . . data operator 111N of FIG. 1) and one or more data stores 112. The plurality of data operators 111 are connected to the memory management unit 208 and network interface 107. The plurality of data operators 111 are connected to the memory management unit 208 via a plurality of channels 236 (e.g., channel 236A, channel 236B, . . . channel 236N). Channels 236 may be illustrative of a memory interface through which the data operator stack 206 (e.g., an example of a dynamic region 121) connects with the memory stack 204. The network stack 202 is configured to decode incoming data stream and transfer data along to the appropriate data operator 111. The network stack 202 includes network interface 107. The network interface 107 is connected to the plurality of data operators 111 via a plurality of channels 234 (e.g., channel 234A, channel 234B, . . . channel 234N). In one configuration, the network interface 107 is an example of a fabric interface configured to transmit data across a plurality of interconnect fabrics to each data operator of the plurality of data operators 111. The plurality of interconnect fabrics may be connected to one or more disaggregate memory nodes.

The network stack 202 is configured to send/receive data to/from the data operator stack 206. For example, the network stack 202 receives a data query (e.g., from a compute node) and forwards it to the data operator stack 206. The network stack 202 manages all connections between the compute nodes and the plurality of data operators 111. The network stack 202 receives/sends data via the network interface 107. The network interface 107 allows processors on a network to exchange data in main memory, bypassing the operating system and the CPU resources. In one example, the network interface 107 includes a connection protocol that uses zero-copy networking to read data directly from the main memory of one system and write data directly to the main network of another system, improving performance and throughput by freeing up server resources in parallel high-performance computing (HPC) clusters.

The operator stack 206 includes the dynamic logic necessary to push down data operators to the disaggregated memory. Each data operator 111 may be configured to perform NMC (e.g., near memory processing operations). The data operator stack 206 can process data for multiple compute nodes at the same time. For example, the data operators 111 are able to process a number of data queries. The data can be processed within operator pipelines in a streaming fashion where each stage of the processing is fully pipelined so that different stages of processing within each data operator 111 may occur simultaneously. This configuration may be used to exploit both spatial parallelization (e.g., simultaneous execution of tasks by a plurality of processing units) through concurrent dynamic regions and pipelined parallelization. Pipeline parallelization can refer to multiple operators depending on each other, while the execution of each operator can overlap with other data operators 111. Both of these can contribute to the overall performance of the system. It is through the operator stack that the system can identify relationships to previously identified structures and perform optimizations to access data. Optimizations may include prefetching data to be accessed, caching the data in a higher-level cache to be reused frequently, and/or precomputing by speculatively updating metadata to reflect the upcoming IO, buffer allocation, or other parameters associated with the application and data.

The plurality of data operators 111 can be managed via a management operator according to policies and indicators stored in data stores 112. In an example, a management operator can be one of operators 111 that is loaded first and, based on being loaded first, configured to manage other, subsequently loaded data operators 111. The management operator monitors the processing load of other data operators, calculating freshness and gravity (as explained in further detail in the discussion of FIGS. 4 and 5), and reacting based on policies. The management operator may also provide programmatic and user interface to other tools and system administrations. In another example, a management operator can be a controller, which can be implemented, for example, as computing device 700 of FIG. 7.

In one example, the management operator is the first data operator that boots-up (e.g., turns on, starts, comes-on-line, etc.). In configurations where the first data operator that boots-up is the management operator, the first operator may be referred to as a "lead operator." The management operator remains on throughout data operations. If a management operator crashes, any one of a plurality of operators can become the management operator. For example, if a management operator crashes, then a non-management operator can become a management operator.

The data operator stack 206 sends/received data to/from the memory stack 204 via a plurality of connections 236. The memory stack 204 implements the pool of memories 110 and can be used as regular memory, with data being loaded from storage as needed. The memory stack 204 is configured to handle memory allocations, address translations, and concurrent accesses. The memory stack 204 includes memory management unit 208 to translate addresses to the memory. The memory management unit 208 is connected to memory 110 within the memory stack 204 via a plurality of channels (e.g., channel 256A, channel 256B, channel 256N, etc.). For example, the plurality of channels 256 may route a memory 110 to access memory management unit 208. Memory may be allocated to each channel in a striped pattern to optimize the available bandwidth. The operator stack 206 may interface with memory stack 204 to receive data and metadata from the memory stack 204.

Compute nodes can access the disaggregated memory by opening a connection to one of the dynamic regions 121 containing one or more data operators 111, each able to contain one of possible operator pipelines. When a compute node makes a read request, the network stack 202 routes the request to a dynamic region in the operator stack 206 containing data operators 111 assigned to the compute node that initiated the request. The read request is forwarded to the memory stack 204, which translates a virtual address to a physical address in a memory 110, and then issues the actual data request to the memory 110. The compute nodes may have local catalog information that can be used to determine virtual addresses of the memories to be accessed. The returned data is streamed back to the dynamic region 121, where loaded data operators 110 are applied to the data. Finally, the resulting data is forwarded to the network stack 202, and further sent directly to the compute node.

Figure 3:
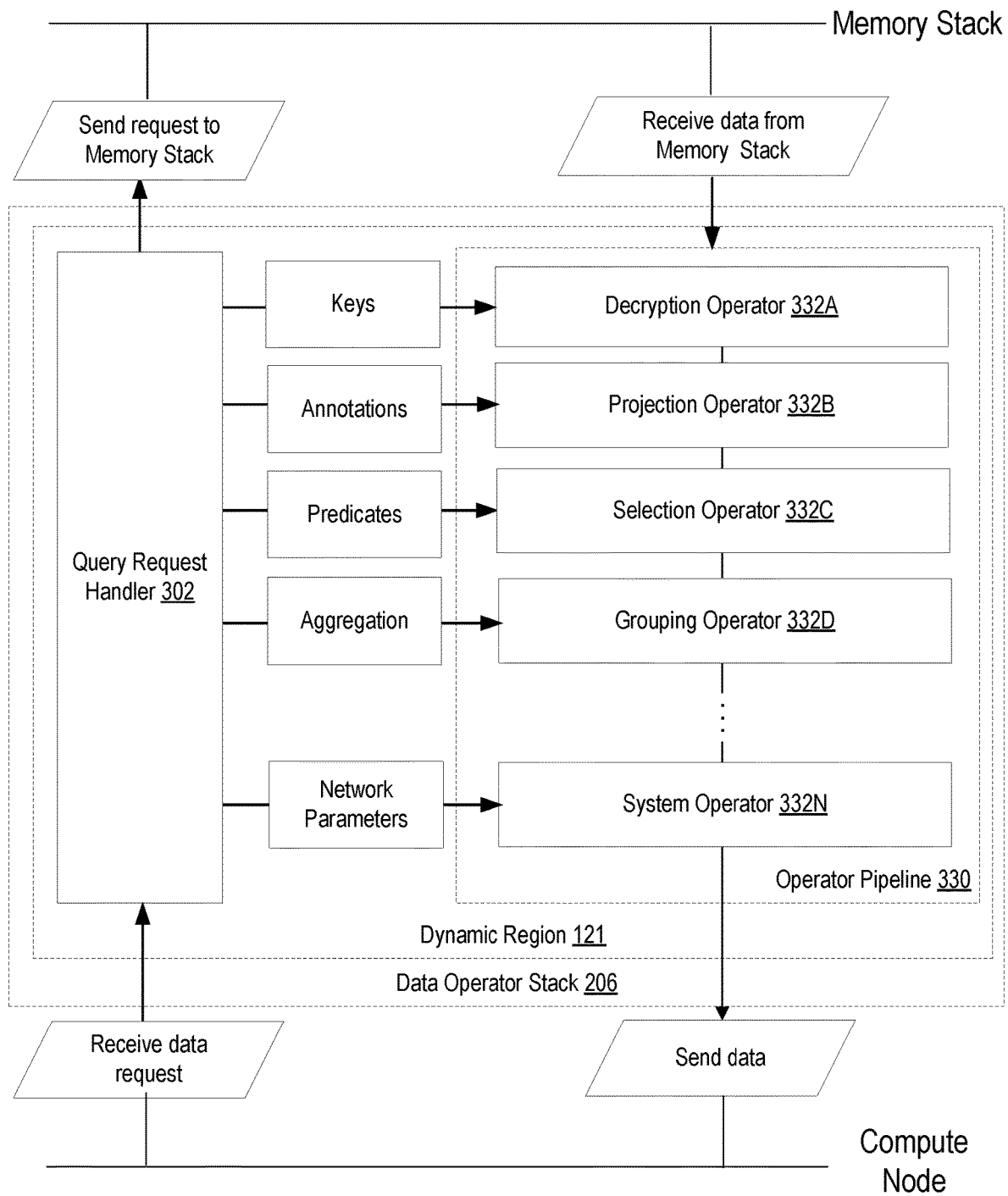
FIG. 3 illustrates an example data operator stack that can be implemented in disaggregated memory.

FIG. 3 illustrates an example dynamic region 121 a of data operator stack 106. FIG. 3 illustrates a generic operator pipeline 330 included in a dynamic region 121, which includes a plurality of data operators 332A-332N (collectively referred to herein as data operators 332) that can process the data object. In one example, the plurality of operators 332 may include projection, selection (e.g., predicate selection, regular expression matching), grouping (e.g., distinct, group by, and aggregation), and system support (e.g., encryption/decryption). In the illustrative example of FIG. 3, the plurality of operators includes a decryption operator 332A, a projection operator 332B, a selection operator 332C, a grouping operator 332D, and a system operator 332N. The operators 332 within the operator pipeline 330 may vary depending on the requested set of queries to be executed.

Each operator pipeline is allocated to a corresponding compute node (e.g., a corresponding compute node 105). The operator pipeline 330 includes one or more data operators 332, each of which provides partial query processing (e.g., processing of data read operations) on data operations to disaggregated memory. The query can be forwarded to the query request handler in the operator stack through query request handler 302. Query request handler 302 can request the data object associated with the query from the memory stack (e.g., memory stack 204). This may be accomplished through addressing, which can allow data to be read in both row store and column store formats, based on the given request. In some embodiments, data can also be read in graph formats or other representations. The data operators 332 used for processing the data object can be precompiled to and can be deployed (e.g., loaded) to dynamic region 121 at runtime. Query request handler 302 can submit the data object to one or more data operators 332 depending on the query.

When a query request arrives, it is first forwarded to the query request handler 302, which requests the data from the memory stack. At the same time, any necessary parameters for additional processing are forwarded to the data operators 332 in the pipeline. Data arriving from the memory is processed in a streaming fashion by these data operators. Once the processing is done, the resulting data is sent back to the client via the network stack.

As an illustrative embodiment, decryption operator 332A may decrypt the data arriving from memory stack 204 if the data is encrypted. For this operation, compute nodes may be required to provide specific keys used for decryption from cipher to plain text. These keys can be provided with the query request. This can allow the system to provide additional levels of security, which is important in modern disaggregated environments.

Projection operator 332B can return a subset of the data object. Projection operator 332B can read a table from the disaggregated memory, parse the incoming data stream based on query parameters describing tuples and their size, and project only the necessary columns into the pipeline for further processing using annotation. This decreases the amount of data provided to subsequent stages and ultimately reduces the amount of overall data movement. Projection operator 332B can use annotation to annotate the tuples with parameters from the requested query. The parameters may state which columns are part of the projection, selection, and grouping phases. Projection operator 332B may annotate the subset of the data object and forward it to selection operator 332C.

Selection operator 332C can filter data further to greatly reduce the amount of data ultimately sent over the network, thus reducing I/O overheads. Selection operator 332C can use predicate selection, regular expression matching, vectorization, or other methods to filter the data. Predicate selection can occur by comparing the value of an attribute of the data object against a constant provided in the query. The annotations from projection operator 332B can assist in determining what is evaluated during the predicate matching phase. Regular expression matching can use string matching via multiple parallel engines in operator stack 206. Performance of this operator may be dominated by the length of the string and does not depend on the complexity of the regular expression used. Vectorization can occur by reading data in parallel from multiple channels in operator stack 206. Individual tuples can be emitted to a set of selection operators operating in parallel. The number of parallel operators may be chosen based on the number of memory channels and the tuple width. Vectorization may be implemented for simpler queries that can be parallelized without data dependencies.

Grouping operator 332D can perform aggregation and eliminate repeated column entries before they are sent to the client application and device. Grouping operator 332D can hash the values and preserve the entries in a hash table in the memory stack. In some examples, the hash table can use cuckoo hashing with several hash tables that can be reviewed in parallel. The cuckoo hashing can evict entries from a hash table and insert them into a separate hash table with a different function to reduce collisions. Grouping operator 332D may group data via aggregation and flush data entries from the hash table based on the requested aggregation results. Aggregation can result in specific groupings that can perform a large portion of the processing already in the disaggregated node (which can be determined based on the particular application) without the need to move all the data to the client first and then fully process the data.

System operator 332N can prepare the data filtered by projection operator, selection operator, and grouping operator to be sent to the client device. System operator 332N may also encrypt the data as needed or as requested by the client device. System operator 332N may also pack data based on the annotated columns from projection operator 332B, resulting in more efficient utilization of the available network bandwidth. The packing may use an overflow buffer to sustain the line rate. In the case of vectorization, the tuples can be combined from each of the parallel pipelines using a round-robin arbiter. System operator 332N may also comprise a sender unit to produce the correct header information in network stack. The sender unit can create RDMA commands without information on the final data size which can allow filtering in the operators where final data size is not known at a time when the request is issued. The sender unit can also forward the data to network stack to be sent to the client application and device.

Figure 4:
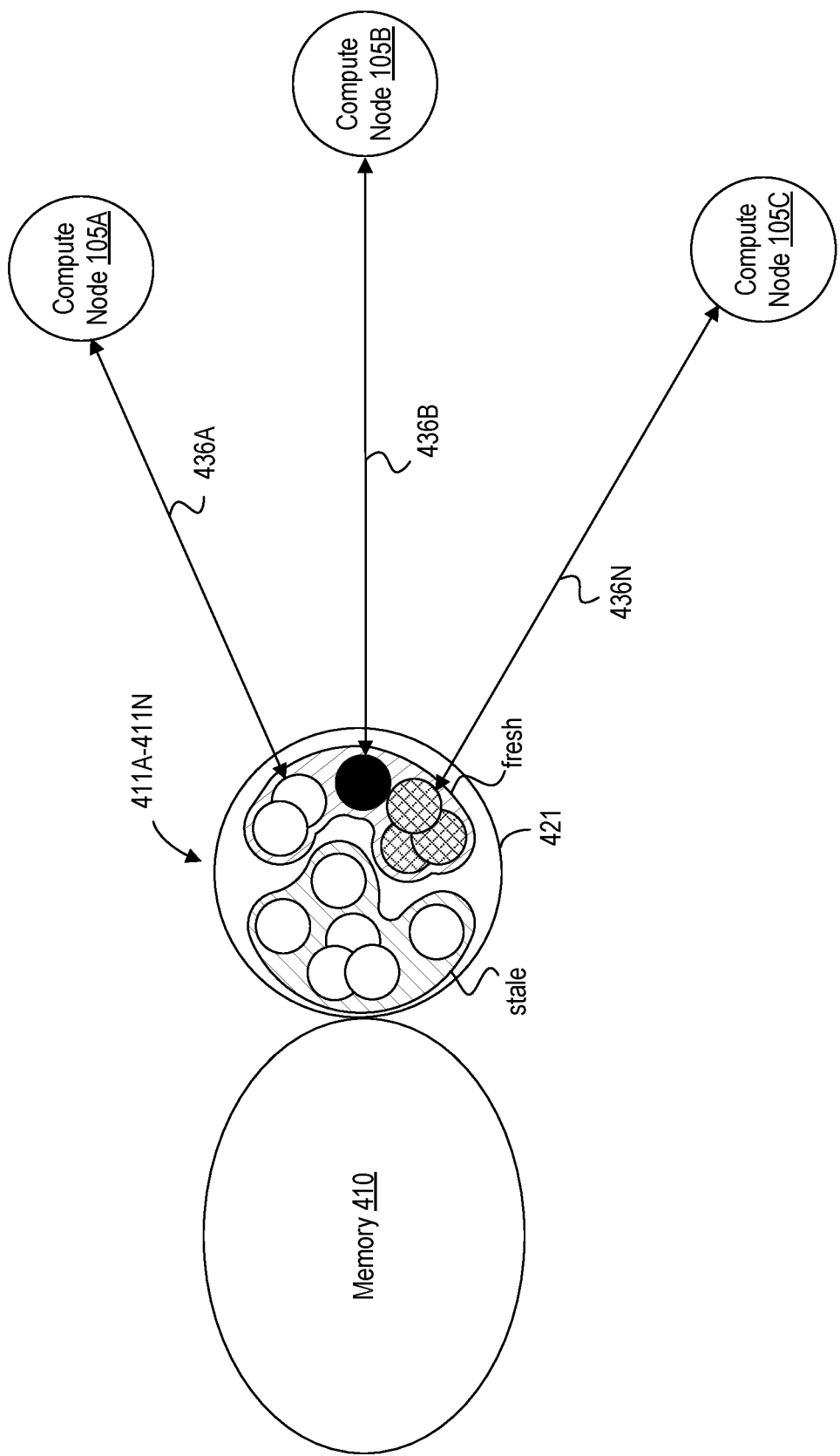
FIG. 4 is an illustration of an example of a freshness usage indicator for managing near memory computes in accordance with implementations of the disclosed technology.

FIG. 4 is an illustration of an example usage indicator of a data operator in accordance with implementations of the disclosed technology. More particularly, FIG. 4 depicts a schematic illustration of a "freshness" indicator of data operators 411A-411N, which may be illustrative of data operators 111A-111N of FIG. 1. FIG. 4 includes memory 410 (e.g., illustrative of one of memories 110), a plurality of compute nodes 105 (e.g., a first compute node 105A, a second compute node 105B, and a third compute node 105N) and data operators 411. The plurality of data operators 411 are disposed within a dynamic region 421, which is illustrative of any one of dynamic region 121 of FIG. 1. Each compute node 105 is communicatively connected to one or more data operators 411 via connections 436. For example, the first compute node 105A is communicatively connected to first one or more data operators via connection 436A, the second compute node 105B is communicatively connected to second one or more data operators via connection 436B, and the third compute node 105N is communicatively connected to third one or more data operators via connection 436N.

If a data operator has not been used for an amount of time or with sufficient frequency and there is other possible operator activity, a new data operator that is fresher (e.g., more recently invoked) can be swapped in for performing the operation. When a data operator is swapped, the invocation to a non-loaded data operator will raise an exception on the invoking data operator. The old operator could be again loaded, which is similar to page faults. The data access can be performed without the operator if the operation was transparent, it would just be much slower (e.g., compression/decompression may have to be done on the invoker side). If the operation is operator-specific and circumstances are not such that operator can be swapped in, an exception can be raised back at the compute node and the compute node may have to re-issue a non-operator specific request, or it may invoke the same request to another disaggregated memory node.

If data operators share resources, such as memory for caching data, or soft cores, cached data can be flushed out after not being used for some time, and soft cores can be allocated to another data operator (e.g., shared resources will be securely flushed when explicitly requested by the client or when all associated data operators have been de-allocated).

Resources that could be attached to a data operator can be used to measure a degree of the data operator freshness. The "degree of data operator freshness" is a method of determining an amount of time the data operator has been used or the frequency of use of the data operator. When the data operator has been extensively used all resources may be assigned and used by the data operator. A data operator that has been more recently used as compared to other data operators can be assigned a high degree of freshness. A data operator that has not been recently compared to other data operators used can be assigned a low degree of freshness. Data operators can be ranked according to most recently used or most frequently used. For example, data operators can be ranked from most recently used to those that have not been used (e.g. 30 nanoseconds, 1 second, 3 minutes, etc.). As another example, data operators can be ranked according to most frequently used to most infrequently used. The ranking may be in an order of high degrees of freshness, to medium degrees, low degrees of freshness, etc. Those data operators that are not used or infrequently used may be an indication that such operators are obsolete.

Figure 5:
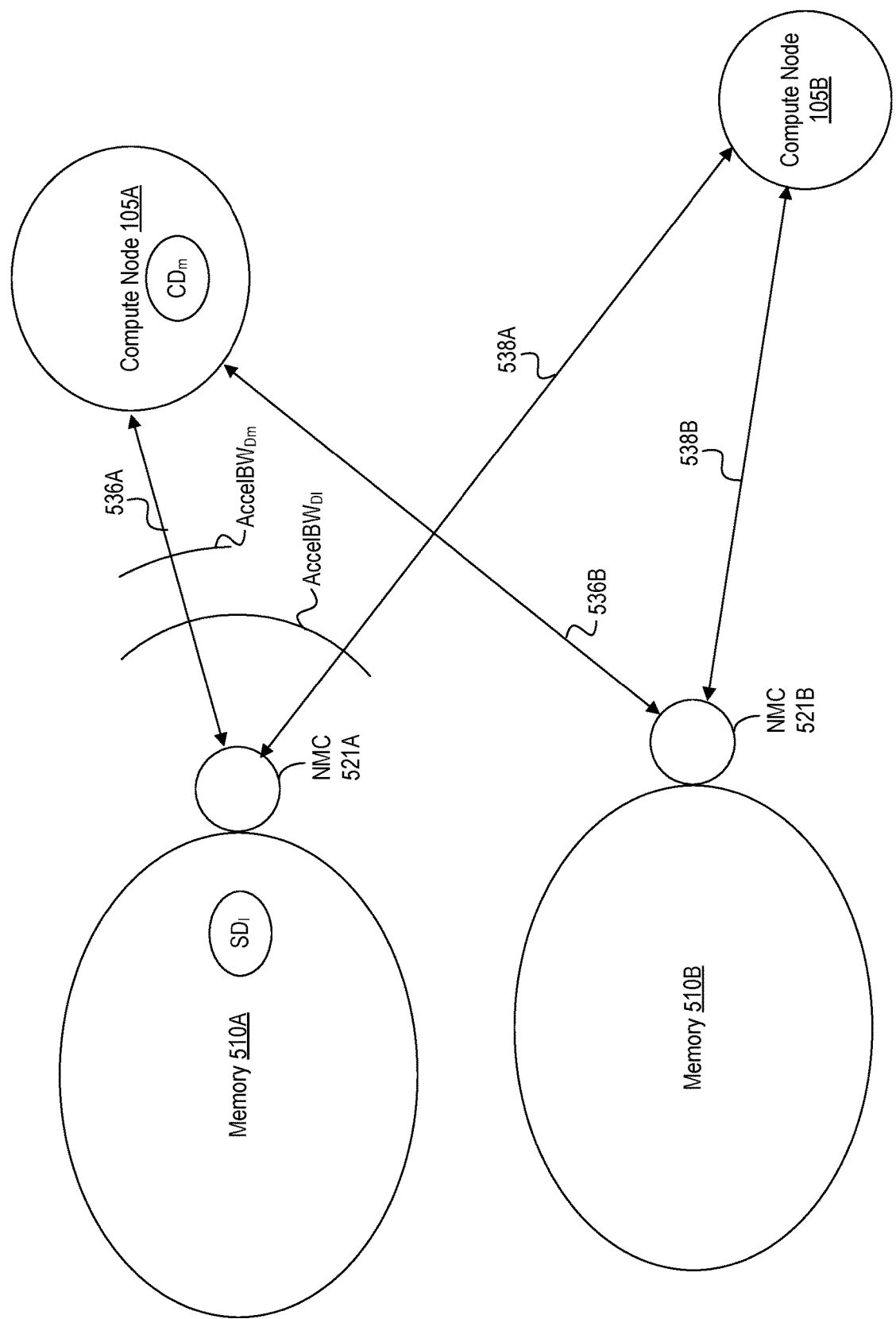
FIG. 5 is an illustration of an example of a gravity usage indicator for managing near memory computes in accordance with implementations of the disclosed technology.

FIG. 5 is an illustration of an example of a usage indicator of an NMC in accordance with implementations of the disclosed technology. More particularly, FIG. 5 depicts a schematic illustration of a "gravity" indicator between a disaggregated memory node and a compute node due to dynamic region. FIG. 5 includes memories 510A and 510B (e.g., illustrative of memories 110, which may be referred to as disaggregated memory nodes), a dynamic regions 521A and 521B (e.g., illustrative of dynamic regions 121) each comprising a plurality of operators (not shown in FIG. 5), and a plurality of plurality of compute nodes 105A and 105B. Each compute node 105 is communicatively connected dynamic regions 521A and 521B via connections 536 and 538, respectively. For example, the first compute node 105A is communicatively connected to dynamic region 521A via connection 536A and dynamic regions 521B via connection 536B. The second compute node 105B is communicatively connected to dynamic region 521A via connection 538A and dynamic regions 521B via connection 538B.

In some implementations, if data is replicated at a memory of memories 510 then the data request can be routed to a dynamic region 521 corresponding to the memories 510 in which the data is replicated, instead of loading a new data operator. Replicated data referrers to data that is cached in a data cache of a memory of memories 510. For example, memories 510 may cache data relevant to a compute node 105. If such data is replicated at a memory 510, a gravity indicator may be determined whether or not to leverage dynamic region 521, and data operators therein, for performing data operations for the compute node 105. For example, if data relevant to a request from compute node 105A is replicated in memory 510A (e.g., cached in memory 510A), compute node 105A could direct its data operations to dynamic region 521A for performing operations via data operators of dynamic region 521A. If data is replicated relevant to first compute node 105A is cached at multiple disaggregated memory nodes (e.g., memory 510A and memory 510B), gravity indicators may be used to decide which dynamic region to direct a data operation request. For example, a data operation request may be directed to a dynamic region 521 having a highest gravity indicator as compared to other dynamic regions 521. Thus, memories 510 may be ranked according to gravity indicators and used to select those having the highest gravity for directing data requests.

Leveraging replicated data instead of loading new data improves bandwidth performance, decreases latency and reduces energy thus improving computing performance. For example, since data is already present on one of memories 510 for a given data request operation, the compute node 105 does not need to request the cached data. As a result, the bandwidth of an interconnect between compute node 105 and memories 510 (e.g., connections 536 and/or connections 538) is effectively increased (e.g., accelerated) as the interconnect can be used for other data exchanges. The bandwidth is effectively increased above the actual bandwidth of the interconnect, for example, the bandwidth available in a case where dynamic region 521 is not used for data operations and all data operations are performed at the compute node 105. In the case were dynamic region 521 is not used, there may be a need to request and exchange all data from the memories 510 that would be needed for each data operation. Furthermore, since a data request operation can be performed using the cached data, the dynamic region 521 can leverage the replicated data to perform operations closer to the memories 510. As a result, latency due to data exchanges on the interconnect can be reduced, thereby effectively increasing processing times and reducing latency.

The increase in effective bandwidth can be data operator dependent. For example, if the data operator is implemented for pointer chasing, the data operator will not have to go through the interconnect interface, which may have latency in the hundreds of ns. Instead, point chasing operation can be performed over the lower latency memory interface, thereby reducing latency and effectively increasing bandwidth. As another example, if a data operator is implemented for filtering, fewer bits data will need to be transferred over network, which permits executing many more data requests over the network. In yet another example, if a data operator is implemented for computation close to memory and not on the compute node, the compute node's resources can be freed up to perform other operations, etc.

The gravity indicator $$\left(NMC_{GravityForce_{S_i \leftrightarrow C_j}}\right)$$

due to a respective dynamic region 521 between a respective compute node 105 and a respective memory 510 can be calculated as follows:

$$NMC_{GravityForce_{S_i \leftrightarrow C_j}} = g \times \frac{SD_l \times CD_m}{1/AccelBW_{D_i} \times 1/AccelBW_{D_j}} \quad \text{Eq. 1}$$

Where $S_i$ represents a respective memory of memories 510 of a number i of memories 510 of a disaggregated memories severing compute node 105. $C_j$ represents a respective compute node 105 issuing data request operations for the disaggregated memory. $SD_l$ represents an amount or size (e.g., in terms of bytes, such as megabytes, gigabytes, etc.) of addressable data residing on memory $S_i$ relevant to a data request by compute node $C_j$. $CD_m$ represents an amount or size of addressable data residing on the compute node $C_j$ that could be attributed to the memory $S_i$. $AccelBW_{Dl}$ represents an effective (e.g., accelerated) bandwidth of the memories 510 in a case where the dynamic region 521 is leveraged for a respective data request, and $AccelBW_{Dm}$ represents the effective bandwidth of the respective compute node 105. Variable g represents a processing factor, which is a constant (sometimes referred to as a gravity or gravitational constant) for the respective dynamic region 521 and is proportional to the amount of processing to be performed by the respective dynamic region 521 for a given data request. Thus, similar to gravitational force, $$NMC_{GravityForce_{S_i \leftrightarrow C_j}}$$

is calculated my multiplying the $SD_l$ (e.g., analogized to a mass of a memory 510) by $CD_m$ (e.g., analogized to a mass of compute node 105). Similar to gravitational force where the product of the masses of two bodies is divided by the radial distance therebetween, the product of $SD_l$ and $CD_m$ is divided by a product of the inverse of $AccelBW_{Dl}$ multiplied by an inverse of $AccelBW_{Dm}$. The resultant is then multiplied by processing factor (g).

In an illustrative example of FIG. 5, memory 510A may be memory $S_i$ having a size of data $SD_l$ attributed to a respective data request for compute node $C_j$. In this example, first compute node 105A may be compute node $C_j$ having a size of data $CD_m$ stored thereon. The effective bandwidth of memory 510A is $AccelBW_{Dl}$ and the effective bandwidth of first compute node 105A is $AccelBW_{Dm}$. Thus, the gravity indicator $$NMC_{GravityForce_{S_i \leftrightarrow C_j}}$$

of memory 510A to first compute node 105A due to dynamic region 521A can be calculated using Equation 1 above. The gravity indicator between memory 510A and other compute nodes, as well as between other compute nodes and memories 510B, can be calculated in similar manners.

Gravity can be expressed towards individual regions (e.g., addresses) hosted by memories 510 (e.g., disaggregated memory nodes). The addressable regions can be tracked by partitioning the address space of the memories 510 and mapping a source of data requests to the individual regions. That is, for example, mapping a source of a data request for given data to an individual region of a memory 510 in which the data is addressed. When a certain number of requests in whole history or per unit of time is achieved, a gravity indicator can be determined between the compute node and the given region of a memory 510 due to a dynamic region 521 corresponding to that memory 510. Multiple data operators can serve each addressed region, therefore an aggregate gravity indicator can be tracked for the dynamic region 521, as a well as individual gravity for each data operators.

Figure 6:
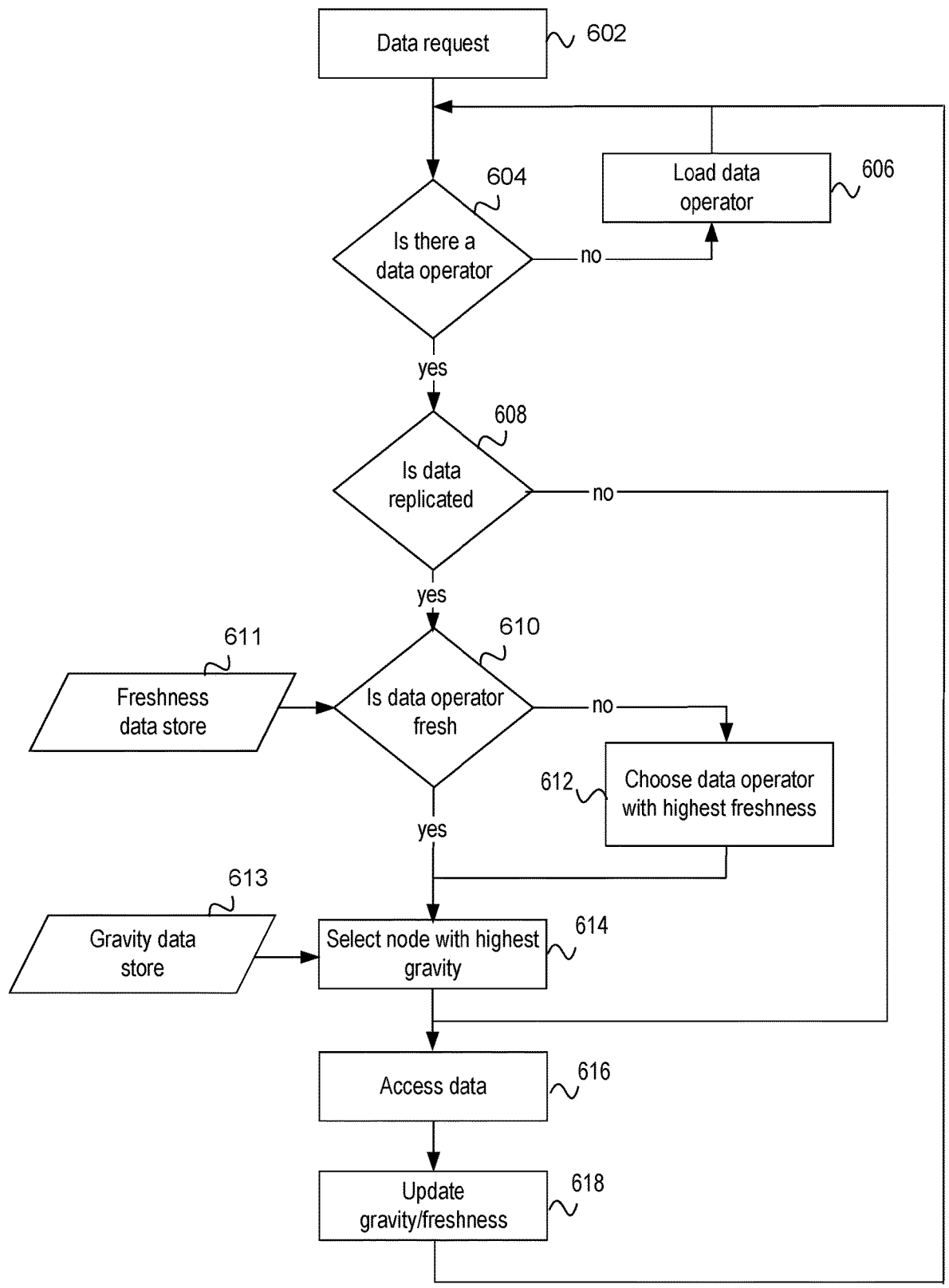
FIG. 6 is an example flowchart of a method for routing data query operations to a disaggregated memory in accordance with implementations disclosed herein.

FIG. 6 is an example flowchart of a method 600 of routing data requests to a disaggregated memory node in accordance with implementations disclosed herein. The method 600 may be performed by a compute node (e.g., compute node 105 of FIG. 1) for determining which disaggregated memory node (e.g., memories 110 of FIG. 1) to direct a data request towards. As described above, each disaggregated memory node may comprise a corresponding dynamic region (e.g., dynamic region 121 of FIG. 1) having a plurality of data operators therein (e.g., data operators 111). The method 600 comprises using usage indicators, such as freshness indicators and gravity indictors, for managing disaggregated memory nodes for performing data operations related to a data request. At a high level, method 600 includes identifying NMCs having the highest gravity for a data request issued by a compute node to disaggregated memory and identifying data operators having the highest freshness. The method 600 manages the disaggregated memory based on the identified NMCs and data operators for competing the data request.

The method 600 will be described below with reference to a single disaggregate memory node and corresponding NMC. However, a given compute node may perform similar methods, in parallel or sequentially, in connection to each disaggregate memory node of a disaggregated memory.

At block 602, a data request is generated by a compute node. For example, a compute node may receive some input defining an operation, which the compute node uses to determine a number of data operations, such as data request operations and data processing operations. The data request operations may be issued to disaggregated memory for accessing data relevant to the operation. In another example, NMCs may be leverages for performing some or all of the data processing operations on data requested. Thus, in some examples, block 602 may include determining a data processing operation either along with or separate from a data request operation.

At block 604, the method 600 includes determining whether or not there is a data operator present. For example, block 604 includes determining if a data operator is loaded into a NMC of a disaggregate memory node. Here, the compute node determines whether a data operator is present in the NMC and can be used for performing data operations relevant the data request of block 602. If no data operators are loaded into the NMC, the method 600 proceeds to block 606 where a data operator is loaded into the NMC.

The determination at block 604 may be performed in several different ways. For example, a data operator can operator on a disaggregated memory node and, if it is known that there is a possible data operator assigned to the disaggregated memory node and it is not loaded into the NMC, then the determination at block 604 is NO. As another example, an explicit invocation of a data operator could be issued, and, if the data operator invoked is not loaded into the NMC, then an alert will be raised and the determination at block 604 would be NO. As yet another example, if the data of a particular request is encrypted and, if a data operator for performing decryption is not loaded, the data may not be accessible. In this case, the determination at block 604 would be NO. These are only some examples, other ways of determining whether or not a data operator is loaded are possible.

If a data operator is present, the method 600 proceeds to block 608 to determine whether or not data relevant to the data request of block 602 is replicated on the disaggregate memory node. For example, the compute node checks if the disaggregate memory node, in which the data operator is present from block 604, has cached data relevant for completing the data request of block 602. In an example implementation, a compute node may hold data tables indicating where the compute node can issue data requests. Thus, the compute node can check with the indicated disaggregated memory node has cashed relevant data. If relevant data is not replicated, the method 600 proceeds to block 616 to access data according to the data request.

If the compute node determines that data is replicated, method proceeds to block 610 to determines if the data operator identified in block 604 is fresh. For example, the compute node determines a freshness indicator of each data operator of the plurality of data operators. If the data operator from block 604 has not been used for some amount of time or with sufficient frequency, then the method proceeds to block 612. For example, the method includes accesses a ranking of freshness indicators associated with each data operator from a data store 611 (e.g., data store 112) and checks if the data operator from block 604 has the highest freshness indicator. If the freshness indicator for the data operator is the highest from the ranking, then the method 600 proceeds to block 614. Otherwise, the method 600 proceeds to block 612 and selects a data operator having the highest freshness. For example, block 612 can include swapping out the data operator identified in block 604 with a data operator having a higher freshness indicator. The freshness indicators may be determined, for example, either in parallel with block 610, in parallel with method 600, or prior to block 602.

At block 614, the method 600 includes selecting a disaggregate memory node with the highest gravity indicator. For example, using Eq. 1 above, a gravity indicator between the compute node and each disaggregate memory node due to an NMC corresponding to the disaggregated memory node can be determined for the data request of block 602. That is, an amount of data relevant to the data request cached at each disaggregate memory node may be used to determine $SD_l$ for each node. Similarly, an amount of data relevant to the data request at the compute node may be used to determine $CD_m$ for the compute node. The effective bandwidth due to each NMC can be used to determine the $AccelBW_{D_i}$ from the viewpoint of each disaggregated memory node and $AccelBW_{D_j}$ from the viewpoint of the compute node. The gravity indicators for each NMC can be ranked in a data store 613 (e.g., data store 112) associated with each NMC and disaggregated memory node. The compute node accesses the data store 613 and selects the disaggregated memory having the highest gravity. The gravity indicators may be determined, for example, either in parallel with block 614, in parallel with method 600, or prior to block 602.

At block 616, the data operator selected in block 610 (or block 612) loaded onto the NMC associated with the selected disaggregated memory node selected in block 614 accesses the replicated data and performs a data operation in accordance with the data request from block 602. At block 618, the freshness indicators are updated for the data operators and the gravity indicators are updated for the NMC. For example, the freshness and gravity indicators can be determined using updated variable based on performing block 616. The update indicators can then be pushed to data stores 611 and 613 to update the respective indicators.

The foregoing descriptions and the method are provided merely as illustrative examples and are not intended to require or imply that the operations of the various implementation must be performed in the order presented. As will be appreciated by one of skill in the art, the order of operations in the illustrative method 600 may be performed in any order. For example, block 608 may be performed prior to block 604, after blocks 610 and/or 612, etc. As another example, block 614 may be performed prior to or in parallel with blocks 610 and/or 612. Words such as "thereafter," "then," "next," etc. are not intended to limit the order of the operations; these words are simply used as examples to guide the reader through the description of the method.

Figure 7:
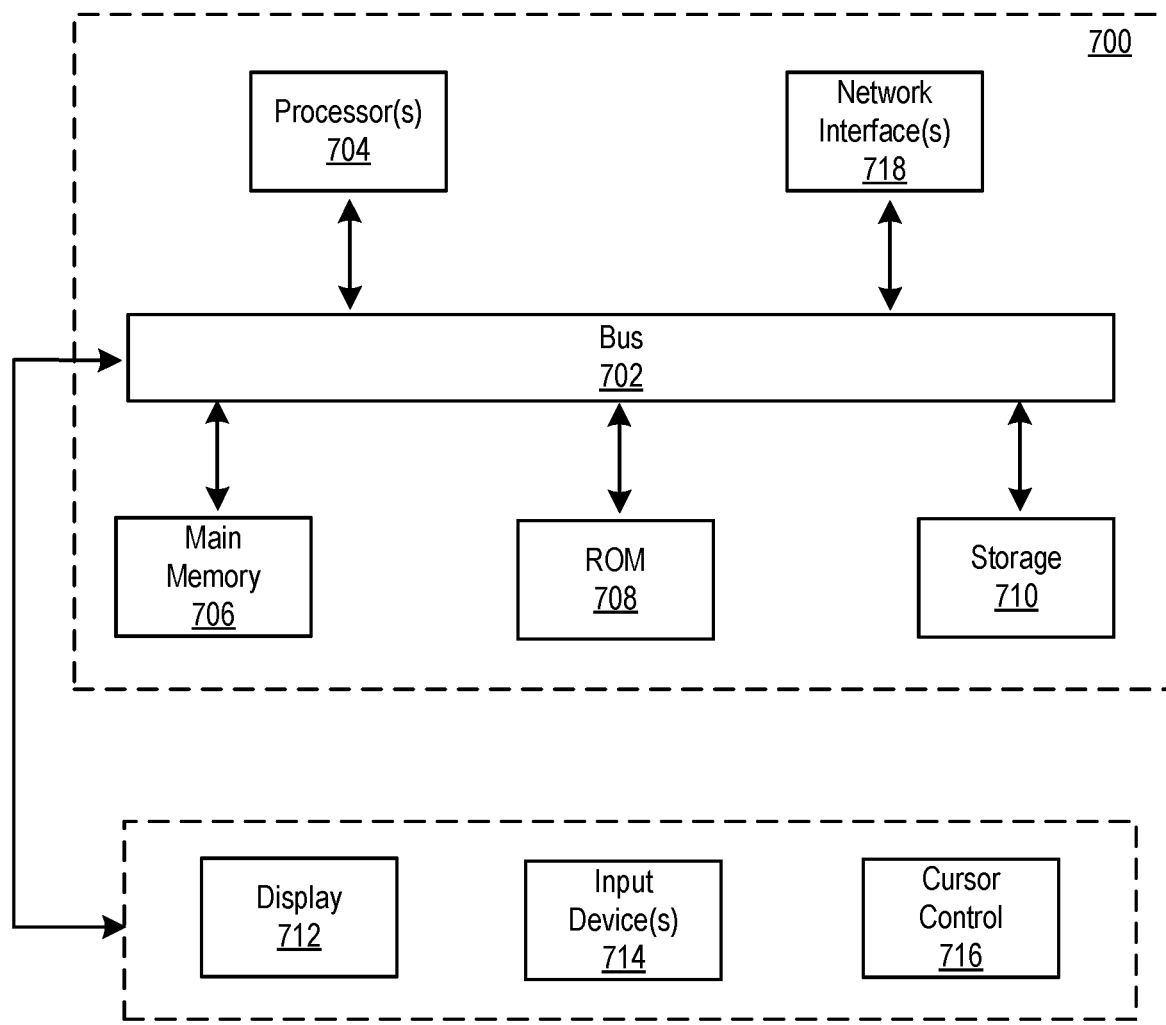
FIG. 7 illustrates a block diagram of an example computer system in which the systems and methods described herein may be implemented.

FIG. 7 depicts a block diagram of an example computer system 700 in which various of the embodiments described herein may be implemented. The computer system 700 may be an example implementation of architecture 100 or any component thereof. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions (e.g., instructions to execute method 600) to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718. The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable medium storing instructions that cause one or more processors of an electronic device to perform operations comprising:
   loading data operators of near memory compute functions offloaded proximate to disaggregated memory nodes;
   assigning a usage value to each data operator based on at least one of:
   (i) a freshness indicator for each data operator, the freshness indicator indicating at least one of an amount of time since the data operator has been used previously or a frequency of use of the data operator; or
   (ii) a gravity indicator for each of the near memory compute functions, the gravity indicator associated with an amount of data responsive to a request being stored in a particular memory node associated with the near memory compute function, the disaggregated memory nodes comprising the particular memory node; and
   allocating data operations to the data operators based on the usage value.

2. The non-transitory machine-readable medium of claim 1, wherein the usage value is based on both of (i) a freshness indicator for each data operators, and (ii) a gravity indicator for each of the near memory compute functions.

3. The non-transitory machine-readable medium of claim 1, wherein the freshness indicator is based on at least one of a frequency of use or amount of time between usage.

4. The non-transitory machine-readable medium of claim 1, wherein the gravity indicator for each of the near memory compute functions is based on at least one of: an amount of data at a disaggregate memory node associated with a respective near memory compute function, or an effective bandwidth of the respective disaggregated memory node due to the near memory compute function.

5. The non-transitory machine-readable medium of claim 1, wherein the gravity indicator for each of the near memory compute functions is based on replicated data at a respective disaggregate memory node associated with the each near memory compute function.

6. The non-transitory machine-readable medium of claim 1, wherein the gravity indicator for each of the near memory compute functions is based a constant for each respective near memory compute that is proportional to an amount of processing on each respective near memory compute.

7. A method for accessing data from a disaggregated memory, the method comprising:
   receiving a data request operation associated with a compute node;
   selecting one or more data operators of a near memory compute function, the near memory compute function being associated with a memory node of the disaggregated memory, to perform the data request operation based on at least one of:
   a freshness indicator associated with the one or more data operators, the freshness indicator indicating at least one of an amount of time since the one or more data operators have been used previously or a frequency of use of the one or more data operators; or
   a gravity indicator associated with the near memory compute function, the gravity indicator associated with an amount of data responsive to a request being stored in the memory node associated with the near memory compute function; and
   performing the data request operation, at least in part, using the one or more data operators.

8. The method of claim 7, wherein selecting the one or more data operators of the near memory compute function associated with the memory node of the disaggregated memory to perform the data request operation is based on both of the freshness indicator associated with the one or more data operators and a gravity indicator of associated with the near memory compute function.

9. The method of claim 7, wherein a gravity indicator associated with the near memory compute function is based on an amount of data relevant to the data request operation cached at a respective memory node, an amount of data relevant to the data request operation cached at the compute node, an effective bandwidth of the respective memory node due to the near memory compute function, and an effective bandwidth of the compute node due to the near memory compute function.

10. The method of claim 9, wherein a gravity indicator associated with the near memory compute function is determined as follows:

$$[\![ [\![ NMC ]\!] \_GravityForce ]\!] \_(S\_i \leftrightarrow C\_j) = gx$$

where $NMC_{GravityForce_{S_i \leftrightarrow C_j}}$ is the gravity indicator between the compute node $C_j$ and the respective memory node $S_i$ due to the near memory compute function, $SD_i$ is the amount of data relevant to the data request operation cached at the respective memory node $S_i$, $CD_m$ is the amount of data relevant to the data request operation cached at the compute node $C_j$, $AccelBW_{D_i}$ is the effective bandwidth of the near memory compute function due to the respective memory node $S_i$, $AccelBW_{D_m}$ is the effective bandwidth of the compute node $C_j$ due to the near memory compute function, and g is a constant proportional to an amount of processing performed by the near memory compute function.

11. The method of claim 7, wherein the disaggregated memory comprises a plurality of memory nodes, each associated with a near memory compute function of a plurality of near memory compute functions, wherein each near memory compute function comprises a plurality of data operators.

12. The method of claim 11, further comprising:
determining that data relevant to performing the data request operation is replicated on a first memory node of the plurality of memory nodes; and
identifying a near memory compute function associated with the first memory node having a highest gravity indicator;
wherein the selected one or more data operators are comprised in the identified near memory compute function.

13. The method of claim 11, further comprising:
identifying at least one data operator having a highest freshness indicator;
wherein the selected one or more data operators comprise the identified at least one data operator.

14. A disaggregated memory system, comprising:
one or more memory nodes storing data;
at least one near memory compute function associated with a first memory node of the one or more memory nodes, the first memory node comprising one or more data operators; and
at least one hardware processor configured to execute instructions stored in a memory to:
receive a data request operation associated with a compute node;
select one or more data operators of a near memory compute function associated with a memory node of the one or more memory nodes to perform the data request operation based on at least one of:
a freshness indicator associated with the one or more data operators, the freshness indicator indicating at least one of an amount of time since the one or more data operators have been used previously or a frequency of use of the one or more data operators; or
a gravity indicator associated with the near memory compute function, the gravity indicator associated with an amount of data responsive to a request being stored in the memory node associated with the near memory compute function; and
perform the data request operation, at least in part, using the one or more data operators.

15. The disaggregated memory system of claim 14, wherein the at least one hardware processor is further configured to execute the instructions to:
select the one or more data operators of the near memory compute function associated with the memory node of the disaggregated memory to perform the data request operation based on both of the freshness indicator associated with the one or more data operators and a gravity indicator of associated with each near memory compute functions.

16. The disaggregated memory system of claim 14, wherein a gravity indicator associated with the near memory compute function is based on an amount of data relevant to the data request operation cached at a respective memory node of the one or more memory nodes, an amount of data relevant to the data request operation cached at the compute node, an effective bandwidth of the respective memory node due to the near memory compute function, and an effective bandwidth of the compute node due to the near memory compute function.

17. The disaggregated memory system of claim 16, wherein a gravity indicator associated with the near memory compute function is determined as follows:

$$[\![ [\![ NMC ]\!] \_GravityForce ]\!] \_(S\_i \leftrightarrow C\_j) = gx$$

where $NMC_{GravityForce_{S_i \leftrightarrow C_j}}$ is the gravity indicator between the compute node $C_j$ and the respective memory node $S_i$ due to the near memory compute function, $SD_i$ is the amount of data relevant to the data request operation cached at the respective memory node $S_i$, $CD_m$ is the amount of data relevant to the data request operation cached at the compute node $C_j$, $AccelBWD_i$ is the effective bandwidth of the near memory compute function due to the respective memory node $S_i$, $AccelBW_{D_m}$ is the effective bandwidth of the compute node $C_j$ due to the near memory compute function, and g is a constant proportional to an amount of processing performed by the near memory compute function.

18. The disaggregated memory system of claim 14, wherein the one or more memory nodes comprises a plurality of memory nodes, each associated with a near memory compute function of a plurality of near memory compute functions, wherein each near memory compute function comprises a plurality of data operators.

19. The disaggregated memory system of claim 18, wherein the at least one hardware processor is further configured to execute the instructions to:
determine that data relevant to performing the data request operation is replicated on a first memory node of the plurality of memory nodes; and
identify a near memory compute function associated with the first memory node having a highest gravity indicator;
wherein the selected one or more data operators are comprised in the identified near memory compute function.

20. The disaggregated memory system of claim 18, wherein the at least one hardware processor is further configured to execute the instructions to:
identify at least one data operator having a highest freshness indicator;

wherein the selected one or more data operators comprise the identified at least one data operator.

* * * * *